US011803097B1

(12) United States Patent
Chou et al.

(10) Patent No.: US 11,803,097 B1
(45) Date of Patent: Oct. 31, 2023

(54) SELF-SEEDED OPA SYSTEM

(71) Applicant: HC PHOTONICS CORP., Hsinchu (TW)

(72) Inventors: Ming-Hsien Chou, Hsinchu (TW); Jui-Yu Lai, Hsinchu (TW); Chih-Rong Chen, Hsinchu (TW)

(73) Assignee: HC PHOTONICS CORP., Hsinchu (TW)

( * ) Notice: Subject to any disclaimer, the term of this patent is extended or adjusted under 35 U.S.C. 154(b) by 0 days.

(21) Appl. No.: 17/847,035

(22) Filed: Jun. 22, 2022

(51) Int. Cl.
*G02F 1/35* (2006.01)
*G02F 1/39* (2006.01)
*G02F 1/355* (2006.01)

(52) U.S. Cl.
CPC .......... *G02F 1/3542* (2021.01); *G02F 1/3503* (2021.01); *G02F 1/3509* (2021.01); *G02F 1/3551* (2013.01); *G02F 1/3558* (2013.01); *G02F 1/392* (2021.01); *G02F 2201/305* (2013.01); *G02F 2202/20* (2013.01); *G02F 2203/05* (2013.01); *G02F 2203/11* (2013.01)

(58) Field of Classification Search
CPC .................................................... G02F 1/3542
See application file for complete search history.

(56) References Cited

U.S. PATENT DOCUMENTS

| 5,577,058 | A | * | 11/1996 | Kafka | G02F 1/39 372/39 |
| 5,912,910 | A | * | 6/1999 | Sanders | G02F 1/39 359/326 |
| 6,456,424 | B1 | * | 9/2002 | Arbore | G02F 1/39 359/330 |
| 6,980,354 | B1 | * | 12/2005 | Smith | G02F 1/39 359/330 |
| 7,330,300 | B1 | * | 2/2008 | Yu | G02F 1/3534 359/326 |
| 9,190,798 | B2 | * | 11/2015 | Caprara | H01S 3/0092 |
| 9,523,607 | B2 | * | 12/2016 | Malcolm | H01S 3/13 |

* cited by examiner

*Primary Examiner* — Rhonda S Peace
(74) *Attorney, Agent, or Firm* — MUNCY, GEISSLER, OLDS & LOWE, P.C.

(57) ABSTRACT

A self-seeded optical parametric amplifier (OPA) system includes a cavity mirror, a wavelength conversion unit, and a dichroic filter. The cavity mirror is configured to allow high transmission for an input laser beam and high reflection for a feedback beam. The wavelength conversion unit is configured to convert the input laser beam into a signal laser beam and an idler laser beam. The dichroic filter is configured to allow one of the signal laser beam and the idler laser beam to pass through the dichroic filter and reflect the other one onto a feedback path.

18 Claims, 5 Drawing Sheets

SELF-SEEDED OPA SYSTEM

BACKGROUND OF THE INVENTION

1. Field of the Invention

The present invention relates to an optical parametric amplifier (OPA) system, and more particularly to a self-seeded OPA system.

2. Description of Related Art

A traditional laser, such as a semiconductor laser, emits a coherent laser light by transition of electrons or carriers between different energy levels. However, its laser light is fixed to a specific wavelength and limited to low output power, which cannot meet many applications that require wavelength-tunable and high-power laser light, for example, in realizing a gas detector or full-color laser display.

Although some lasers, such as dye lasers, free-electron lasers, solid state lasers and fiber lasers, can produce wavelength-tunable laser light, but there are still many disadvantages such as, for example, small tunable range, low energy conversion efficiency, difficult operation, and high cost.

Therefore, it is desirable to provide an improved OPA system to mitigate and/or obviate the aforementioned problems.

SUMMARY OF THE INVENTION

In the present invention, a self-seeded optical parametric amplifier (OPA) system is realized by using a fanout type periodical poled lithium niobate (PPLN) to convert a shorter-wavelength input laser beam (abbreviated "input") into longer-wavelength laser beams, based on optical parametric generation (OPG) effect. The longer wavelength laser beams include a signal laser beam (abbreviated "signal") and an idler laser beam (abbreviated "idler").

The input, the signal, and the idler are in the form of laser pulses. The signal's wavelength is shorter than two times of the input's wavelength, and the idler's wavelength is longer than two times of the input's wavelength, so the idler's wavelength is longer than the signal's wavelength.

One of the signal and the idler may be chosen to be a feedback beam into the PPLN for self-seeding, and the other one correspondingly becomes an output beam. Such choice is made depending on the desired wavelength range of the output beam, that is, if the idler's wavelength is near the desired wavelength range, then the signal is chosen to be the feedback beam, and vice versa. A feedback path may be implemented by a mirror and preferably a grating.

With such feedback, the entire mechanism of the system of the present invention is realized as optical parametric amplification (OPA). The system of the present invention provides increased conversion efficiency and narrowed output bandwidth.

In addition, a translation stage and a rotation stage may be introduced into the system to respectively carry the PPLN and the mirror, so as to carry out a large range of wavelength tunability and the corresponding narrow linewidth.

Other objects, advantages, and novel features of the invention will become more apparent from the following detailed description when taken in conjunction with the accompanying drawings.

DETAILED DESCRIPTION OF THE EMBODIMENT

Figure 1:
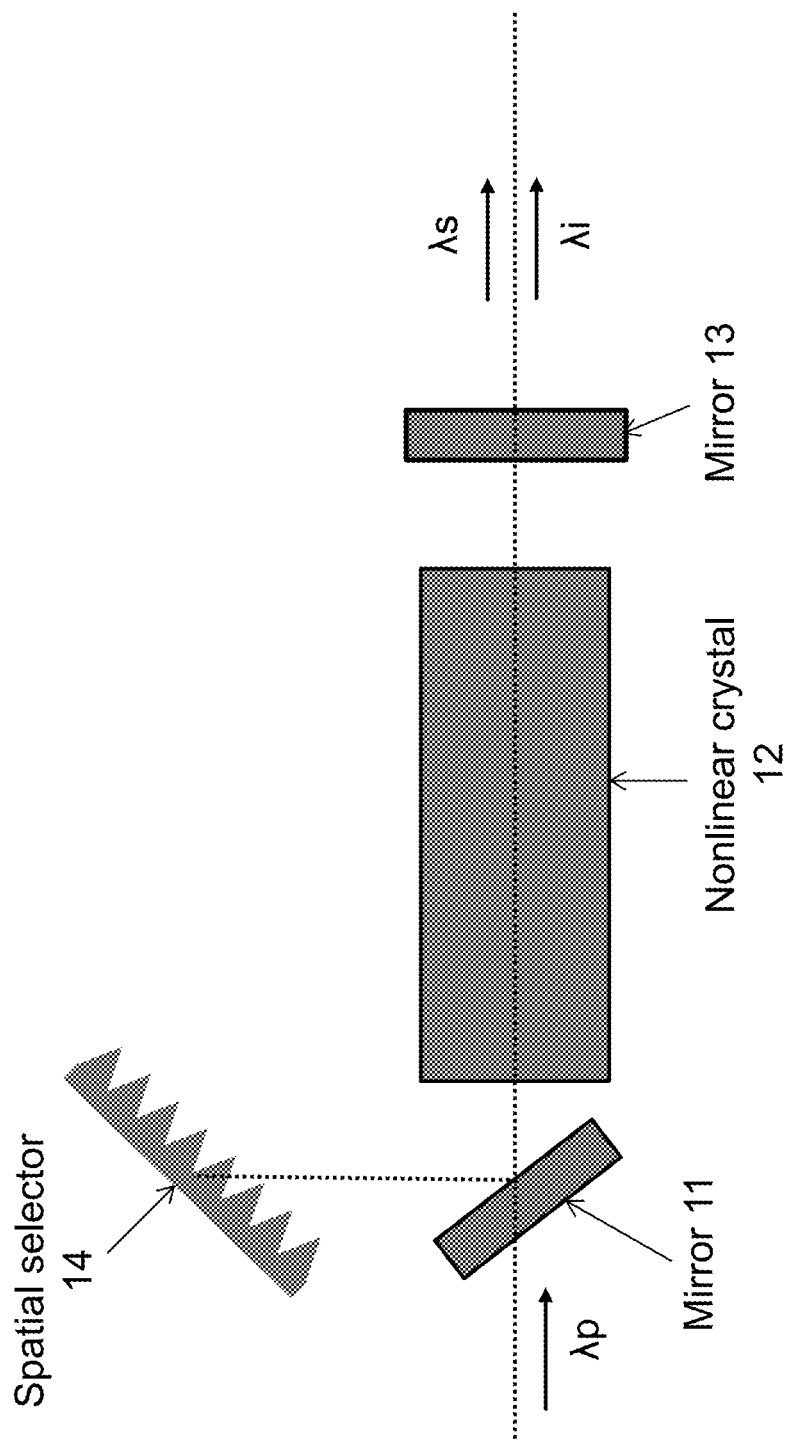
FIG. 1 is a schematic diagram of an optical parametric amplifier (OPA) system according to a comparative example.

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

Moreover, in the present specification, the terms, such as "top", "bottom", "left", "right", "front", "back", or "middle", as well as the terms, such as "on", "above", "under", "below", or "between", are used to describe the relative positions among a plurality of elements, and the described relative positions may be interpreted to include their translation, rotation, or reflection.

Moreover, in the present specification, when an element is described to be arranged "on" another element, it does not essentially mean that the elements contact the other element, except otherwise specified. Such interpretation is applied to other cases similar to the case of "on".

Moreover, in the present specification, the terms, such as "preferably" or "advantageously", are used to describe an optional or additional element or feature, and in other words, the element or the feature is not an essential element, and may be ignored in some embodiments.

Moreover, in the present specification, when an element is described to be "suitable for" or "adapted to" another element, the other element is an example or a reference helpful in imagination of properties or applications of the element, and the other element is not to be considered to form a part of a claimed subject matter; similarly, except otherwise specified; similarly, in the present specification, when an element is described to be "suitable for" or "adapted to" a configuration or an action, the description is made to focus on properties or applications of the element, and it does not essentially mean that the configuration has been set or the action has been performed, except otherwise specified.

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

(Comparative example)

With reference to the comparative example as shown in FIG. 1, a pump laser beam with wavelength λp is inputted or incident into a resonant cavity. The resonant cavity includes a mirror 11, a nonlinear crystal 12, another mirror 13, and a spectral selector 14. The spectral selector 14 is used to select a desired resonating wavelength λs, and then the resonant cavity resonates at wavelength λs. Finally, a signal laser beam with wavelength λs and an idler laser beam with wavelength λi are extracted through the mirror 13.

(System architecture)

Figure 2:
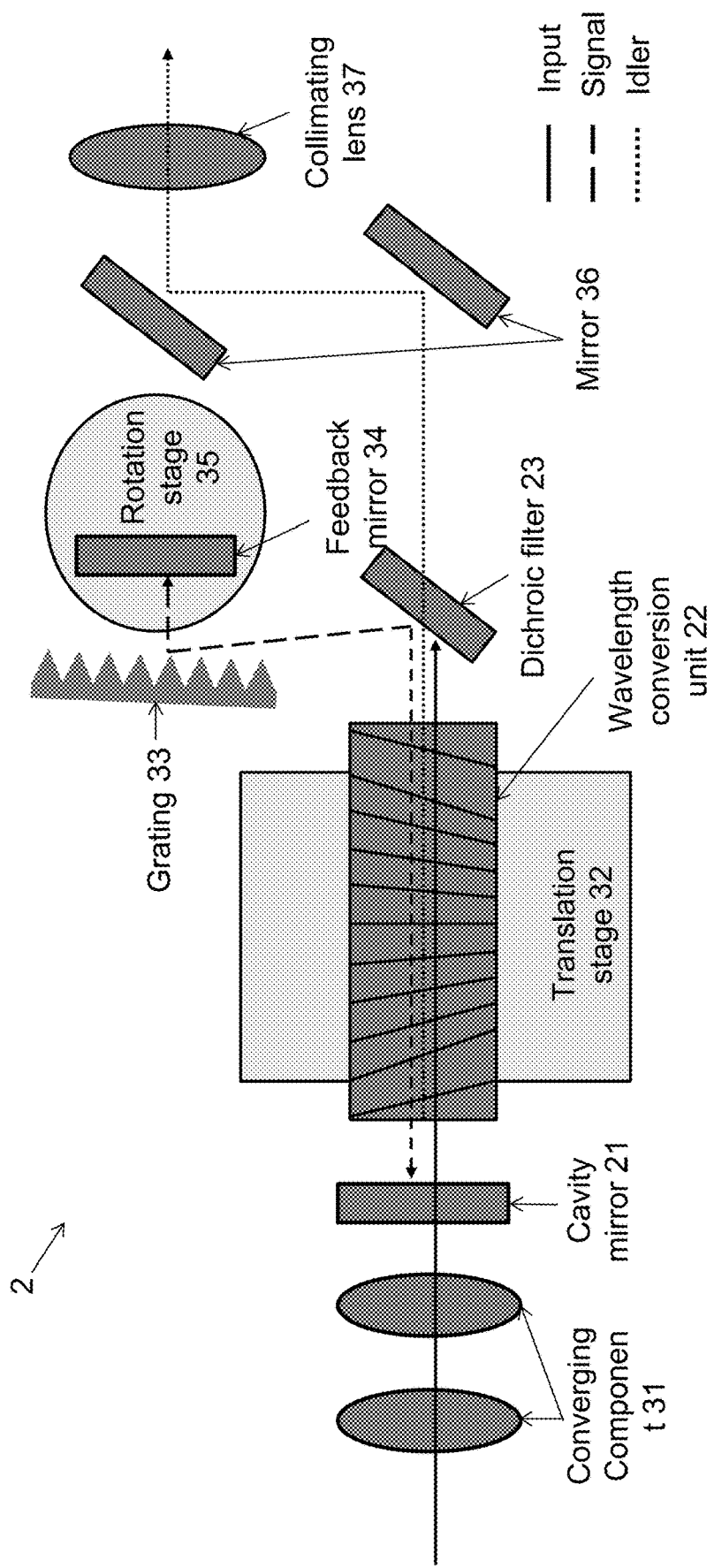
FIG. 2 is a schematic diagram of the OPA system of the present invention.

With reference to FIG. 2, the self-seeded optical parametric amplifier (OPA) system 2 of the present invention mainly includes a cavity mirror 21, a wavelength conversion unit 22, and a dichroic filter 23 arranged in an optical path.

In the system 2, an input laser beam (abbreviated "input") is incident into the cavity mirror 21. The cavity mirror 21 is configured to allow high transmission for the input and high reflection for a feedback beam, and on the contrary, low reflection for the input and low transmission for the feedback beam. The terms "high" and "low" are defined relatively to each other. The cavity mirror 21 may be a plane mirror or a concave mirror with specific coatings to realize the aforementioned configuration. Optionally or preferably, a converging component 31, such as a set of converging lenses, may be arranged before the cavity mirror 21 and used to adjust the input laser beam size (or its diameter) to satisfy the requirements of subsequent components.

The input enters the wavelength conversion unit 22 after passing through the cavity mirror 21. The wavelength conversion unit 22 is configured to convert the input into a signal laser beam (abbreviated "signal") and an idler laser beam (abbreviated "idler"), based on optical parametric generation (OPG) effect.

The optical parametric generation is also called "optical parametric fluorescence" or "spontaneous parametric down conversion". By optical parametric generation, the input's wavelength λp, the signal's wavelength λs, and the idler's wavelength λi follow the relation of $1/\lambda p=1/\lambda s+1/\lambda i$, and λi>λs. The input, the signal, and the idler are in the form of laser pulses.

The wavelength conversion unit 22 is realized based on the nonlinear optical principle. The input photon is divided, by a nonlinear optical crystal, into the signal photon and the idler photon, both having lower-energy. The respective wavelengths of the signal and the idler are determined by phase matching condition, which is relevant to some parameters such as poling period, temperature or the angle between the input and the optical axes of the nonlinear optical crystal.

In order to realize the aforementioned function, in the present invention, the wavelength conversion unit 22 is made of lithium niobate ($LiNbO_3$), particularly a fanout type periodical poled lithium niobate (PPLN), which has a fan-like structure and periodically alternating polarity. The fanout type PPLN has a special property wherein the same light incident at different incident positions of the fanout type PPLN will be converted to have different wavelengths. In other words, the conversion is dependent on light's incident position. Any other material that has the same property may be utilized as well. Accordingly, optionally or preferably, a translation stage (or table) 32 may be used to carry the fanout type PPLN to change (or shift) the incident position of the fanout type PPLN and thereby realize a large range of the wavelength tunability.

The dichroic filter 23 is configured to allow one of the signal and the idler to pass through it and reflect the other one onto a feedback path. The dichroic filter 23 may be a beam splitter with specific coatings to realize the aforementioned configuration.

One of the signal and the idler may be chosen to be the feedback beam that is fed back into the wavelength conversion unit 22 for self-seeding, and the other one correspondingly becomes an output beam. Such choice is made depending on the desired wavelength range of the output beam, that is, if the idler's wavelength is in the desired wavelength range, then the signal is chosen to be the feedback beam, and vice versa. In the embodiment as shown in FIG. 2, it is merely an example to choose the signal to be the feedback beam and the idler to be the output beam. In addition, when designing the cavity mirror 21 and the dichroic filter 23, particularly their respective coatings, a wavelength range rather than a single wavelength of the feedback beam needs to be taken into consideration.

A grating 33 and a feedback mirror 34 are placed on the feedback path. In the embodiment as shown in FIG. 2, the dichroic filter 23 reflects the signal to the grating 33. At this moment, the signal may be regarded as a "pre-feedback beam" because it still goes forward. The grating 33 can produce different diffraction angles according to different wavelengths of the pre-feedback beam. For different signal wavelengths generated by the wavelength conversion unit 22, the grating 33 gives different diffraction angles according to the grating equation, $\sin\theta i=\sin\theta d+\lambda/\Lambda$, where $\theta i$ is the incident angle, $\theta d$ is the diffraction angle, $\lambda$ is the signal wavelength, and $\Lambda$ is the grating period. The feedback mirror 34 can be rotated to have the mirror surface perpendicular to the desired diffracted signal beam to form the feedback path. The feedback mirror 34 can reflect the pre-feedback beam having different wavelengths according to a rotational angle of the feedback mirror 34. The feedback mirror 34 may be silver mirror. Optionally or preferably, the feedback mirror 34 may be arranged on a rotation stage (or table) 35 for ease of rotation.

After the pre-feedback beam is reflected by the feedback mirror 34, it becomes the feedback beam, and the feedback beam transmits backward through the grating 33, the dichroic filter 23, and the wavelength conversion unit 22, until the cavity mirror 21. The cavity mirror 21 will reflect the feedback beam again. Therefore, the feedback provides a self-seeding mechanism.

On the other hand, the output beam transmits on an output path. Optionally or preferably, a set of mirrors 36 and a collimating lens 37 may be placed on the output path. In particular, the mirrors 36 may be silver mirrors used to adjust the transmitting direction of the output beam to a desired exit. The collimating lens 37 is used to adjust the output beam shape to produce a collimating output beam as a final output beam.

(Experimental result)

In a practical experiment of the present invention, the input laser beam has a wavelength of 1064 nanometers (nm), pulse energy of 2 mJ, and pulse duration of 25 nanoseconds (ns) at repetition rate of 1 kHz.

Figure 4:
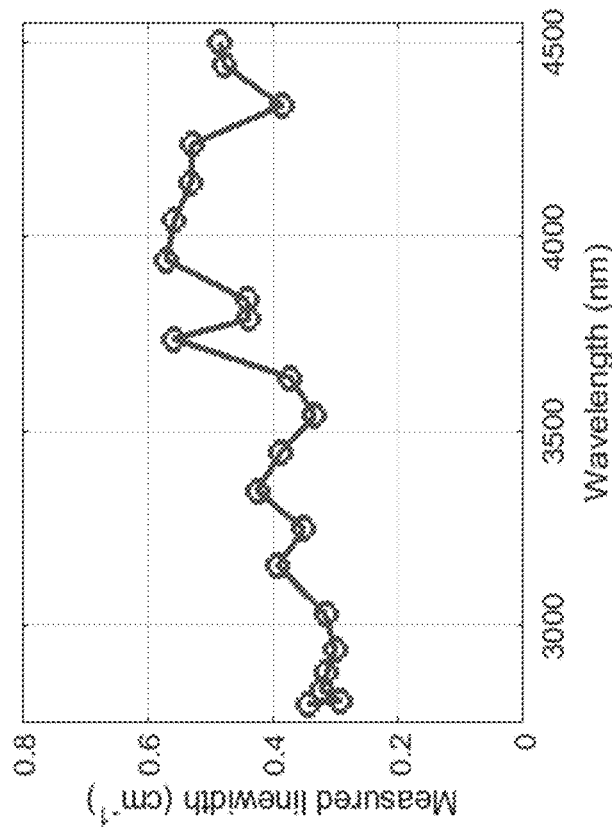
FIG. 4 is measured linewidth to wavelength diagram of the output beam.
Figure 3:
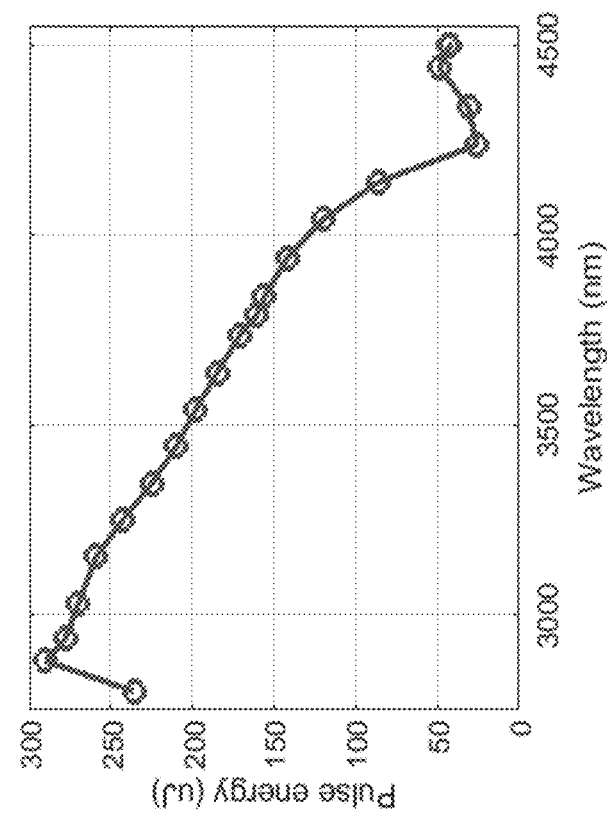
FIG. 3 is pulse energy to wavelength diagram of the output beam.

Through the conversion of the system 2 of the present invention, the output laser beam has a wavelength adjustable between 2800 nm to 4500 nm, pulse energy of about 300 uJ at wavelength of 2900 nm, as shown in FIG. 3, and linewidth smaller than 0.6 cm$^{-1}$, as shown in FIG. 4.

In conclusion, the self-seeded OPA system 2 of the present invention can achieve the following advantages:

(1) the input laser beam (in the form of laser pulses) can be converted from a shorter wavelength to a longer wavelength;
(2) the central wavelength of the converted laser beam (that is the output laser beam) can be tuned in a wider range; and
(3) the converted laser beam has a narrowband linewidth.

In comparison with the comparative example as shown in FIG. 1, the comparative example does not have a translation stage, only a specific input wavelength is tunable, and it is only tunable in a small range, and these are the problems that the prior art faces.

Figure 5:
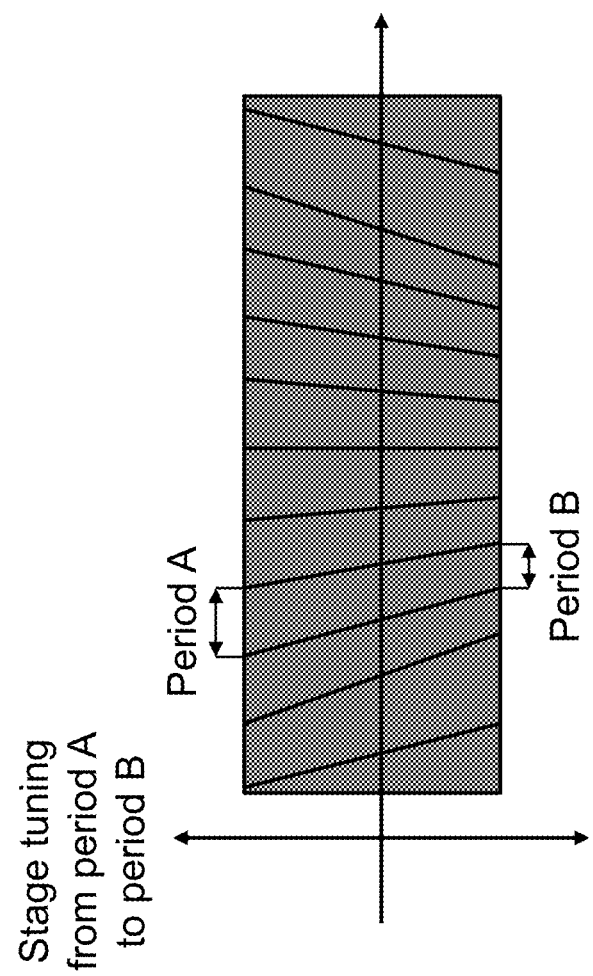
FIG. 5 is a schematic diagram illustrating Stage tuning from period A to period B.

However, with the translation stage carrying the fanout type PPLN, the system of the present invention is applicable to any input wavelength, and it is tunable in any range by modifying the fanout type PPLN structure. As shown in FIG. 5, it is possible to design the period A and the period B of the fanout type PPLN. Different periods can provide different converted wavelengths. Therefore, for different conversion applications, different manufacturing processes can be used to make different fanout type PPLNs having different periods A to B.

Figure 6:
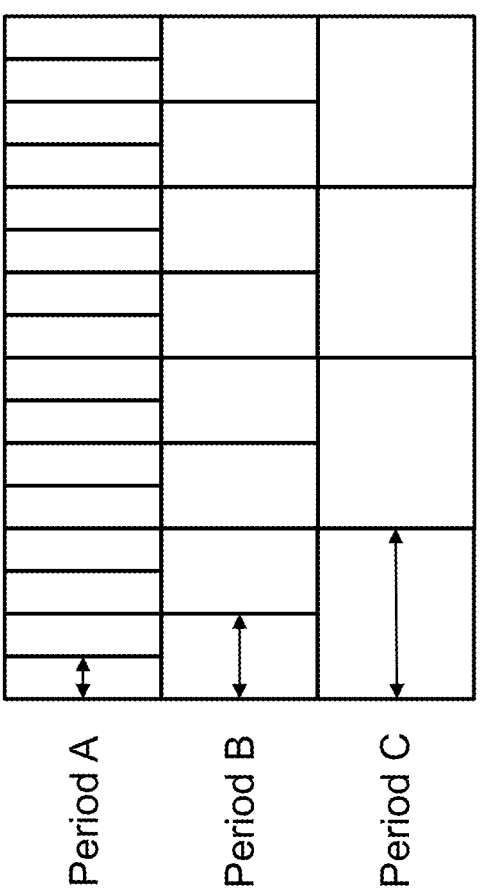
FIG. 6 is a schematic diagram of a multiple type PPLN.

Alternatively, the wavelength conversion unit 22 may be a so-called multiple type PPLN, as shown in FIG. 6, which has multiple regions respectively defined by different periods A, B, and C, for example. It is of course possible to have more regions respectively defined by more different periods in the multiple type PPLN.

Moreover, the spatial selector 14 in the comparative example is typically a grating with Littrow configuration, which requires the incident angle being equal to the diffraction angle. On the contrary, the present invention suggests a great incident angle into the grating 33, and the rotatable mirror 35 can control the reflection of the diffracted beam. With the great incident angle, the present invention provides higher wavelength resolution and narrower band of the converted beam.

It should be understood that the aforementioned experiment is performed to verify the function of the system 2, but not to limit the scope of the present invention. The values of the wavelength, the pulse energy, the pulse duration, and the repetition rate may be changed, and the present invention can still show the advantages for the wavelength conversion.

Although the present invention has been explained in relation to its preferred embodiment, it is to be understood that many other possible modifications and variations can be made without departing from the spirit and scope of the invention as hereinafter claimed.

What is claimed is:

1. A self-seeded optical parametric amplifier (OPA) system, comprising:
    a cavity mirror configured to allow high transmission for an input laser beam and high reflection for a feedback beam;
    a wavelength conversion unit configured to convert the input laser beam into a signal laser beam and an idler laser beam;
    a dichroic filter configured to allow one of the signal laser beam and the idler laser beam to pass through the dichroic filter and reflect the other one onto a feedback path;
    a translation stage or a translation table used to carry the wavelength conversion unit to change an incident position of the input laser beam; and
    a grating and a feedback mirror placed on the feedback path,
    wherein one of the signal laser beam and the idler laser beam is chosen to be the feedback beam that is fed back into the wavelength conversion unit for self-seeding, and the other one correspondingly becomes an output beam.

2. The self-seeded OPA system of claim 1, wherein the cavity mirror is a coated plane mirror or a coated concave mirror.

3. The self-seeded OPA system of claim 1, further comprising a converging component arranged before the cavity mirror and used to adjust a size or a diameter of the input laser beam.

4. The self-seeded OPA system of claim 3, wherein the converging component is a set of converging lenses.

5. The self-seeded OPA system of claim 1, wherein the wavelength conversion unit is made of lithium niobate (LiNbO$_3$).

6. The self-seeded OPA system of claim 5, wherein the wavelength conversion unit is a fanout type periodical poled lithium niobate (PPLN), which has a fanlike structure and periodically alternating polarity.

7. The self-seeded OPA system of claim 6, wherein the wavelength conversion unit has a fanlike structure defined by a first period and a second period, and is tunable by modifying the first period A and the second period thereof.

8. The self-seeded OPA system of claim 6, wherein the wavelength conversion unit is a multiple type periodical poled lithium niobate (PPLN), which has multiple regions having different periods.

9. The self-seeded OPA system of claim 1, wherein the wavelength conversion unit is configured to a light incident at different incident positions of the wavelength conversion unit to have different wavelengths.

10. The self-seeded OPA system of claim 1, wherein the dichroic filter is a coated beam splitter.

11. The self-seeded OPA system of claim 1, wherein such choice is made depending on a desired wavelength range of the output beam.

12. The self-seeded OPA system of claim 1, wherein the dichroic filter reflects the signal laser beam or the idler laser beam, which is regarded as a pre-feedback beam, to the grating.

13. The self-seeded OPA system of claim 12, wherein the grating is configured to produce different diffraction angles according to different wavelengths of the pre-feedback beam.

14. The self-seeded OPA system of claim 13, wherein the feedback mirror is configured to reflect the pre-feedback beam having different wavelengths according to a rotational angle of the feedback mirror.

15. The self-seeded OPA system of claim 14, wherein the feedback mirror is arranged on a rotation stage or a rotation table.

16. The self-seeded OPA system of claim 12, after the pre-feedback beam is reflected by the feedback mirror, the pre-feedback beam becomes the feedback beam, and the feedback beam transmits backward through the grating, the dichroic filter, and the wavelength conversion unit, until the cavity mirror.

17. The self-seeded OPA system of claim 1, further comprising a collimating lens used to adjust a shape of the output beam to produce a collimating output beam as a final output beam.

18. The self-seeded OPA system of claim 1, wherein the output beam has a wavelength adjustable between 2800 nm to 4500 nm and linewidth smaller than 0.6 $cm^{-1}$.

* * * * *